United States Patent Office 3,438,910
Patented Apr. 15, 1969

3,438,910
POLYPHENYLENEIMINES AND PROCESS FOR
THE PREPARATION THEREOF
Eckhard Christian August Schwarz, Grifton, N.C., assignor to E. I. du Pont de Nemours and Company, Wilmington, Del., a corporation of Delaware
No Drawing. Filed Apr. 20, 1965, Ser. No. 449,635
Int. Cl. C08g 23/20, 51/60
U.S. Cl. 260—2   3 Claims

ABSTRACT OF THE DISCLOSURE

Linear polyphenyleneimines are prepared by reacting equimolar amounts of phenylenediamine and phenylenediamine dihydrochloride. These polyimines are useful as epoxy ring-opening catalysts and as antioxidants.

---

This invention relates to a new composition of matter comprising a high-molecular-weight synthetic thermosetting resin and, more particularly, to a high-molecular-weight polyimine.

M-phenylenediamine and p-phenylenediamine are known in the art and their preparation by chemical reduction of the readily available dinitro compounds has been widely noted. Additionally, polymers made from m-phenylenediamine such as polyamides and aldehyde condensation polymers are also well known.

An object of this invention is to provide a new and useful polyimines. Another object is to provide methods for preparing such polyimines. Other objects will appear hereinafter.

The objects of this invention are accomplished by providing a linear, highly polymeric polyimine consisting of the recurring unit

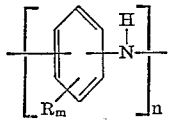

wherein $n$ is an integer of at least 5, R is a member selected from the group consisting of hydrogen and alkyls containing from 1 to 4 carbon atoms, and $m$ is an integer of from 1 to 4, with the proviso that adjacent recurring units have their amine group attached in the same relative position which is oriented in a position other than ortho with respect to the aromatic nucleus.

The process of this invention comprises, in general, contacting and reacting substantially equimolar amounts of a member selected from the group consisting of m-phenylenediamine and p-phenylenediamine and a member selected from the group consisting of m-phenylenediamine dihydrochloride and p-phenylenediamine dihydrochloride at atmospheric pressure and a temperature in the range of from about 220° C. to about 280° C. and continuing said reacting for a period of from about 10 to about 30 minutes. When it is desired to utilize reaction temperatures of from 250° C. to 280° C., it is preferred to first heat the reaction mixture to a temperature in the range of from 220° C. to 240° C. to form a molten reaction mixture and thereafter heat to the desired temperature.

The polyphenyleneimines of this invention may be prepared over a wide molecular range and corresponding intrinsic viscosities and melting points, depending upon reaction time and temperature. If a high-melting, high-molecular weight polymer is desired, more reaction time is allowed and/or the temperature is raised. Conversely, if a low-melting, low-molecular weight polymer is desired, less reaction time is utilized and/or the temperature is lowered.

For most uses of poly m-phenyleneimine, it is preferred to have a polymer melt temperature (PMT) of from about 65° C. to about 280° C. and an intrinsic viscosity in the range of 0.10 to 0.40. With respect to poly p-phenyleneimine, it is preferred to use such polymers with an intrinsic viscosity of from 0.20 to 0.40 and a polymer melt temperature of greater than 380° C.

Poly m-phenyleneimine is crystalline, solid at room temperature, soluble in methanol and possesses a relatively unlimited storage life. Poly p-phenyleneimine is generally a high-melting solid which is soluble in sulfuric acid and insoluble in methanol.

This invention may be further illustrated by the following examples of preferred embodiments, although it will be understood that these examples are included merely for purposes of illustration and, as such, are not intended to limit the scope of the invention. The intrinsic viscosity as used in the examples which follow hereinafter is a measurement of the degree of polymerization of the particular polymer. It was measured in accordance with the procedure disclosed in United States Patent No. 3,068,207 at column 4, line 67ff with the exception that methanol was used as the solvent for Examples 1 through 3 and aqueous sulfuric acid was used as the solvent for Examples 4 and 5. Polymer melt temperature (PMT) as used in the examples is the temperature at which the polymer will leave a molten trail when rubbed across a smooth metal block.

Example 1

10.8 grams of m-phenylenediamine and 18.1 grams of m-phenylenediamine dihydrochloride are heated in a 30 ml. glass test tube at 230° C., for 25 minutes. When the reaction mixture is molten a slow stream of nitrogen (about 20 to 30 cc./minute) is bubbled through the melt by means of a capillary tube extending through the test tube into the melt until the polymerization has terminated. The resuling polymer is then transferred to a 500 ml. flask and 100 ml. methanol is added in which the polymer is soluble. The polymer is then precipitated out of solution by the addition of 200 ml. of water. After the precipitation has terminated, the precipitate is collected and subjected to definitive tests, the results of which are reported in Table 1 below.

Example 2

Example 1 is repeated with the following modification: As soon as the reaction mixture melts at 235° C., the temperature is raised to 250° C., and maintained at that temperature for 20 minutes.

Example 3

Example 1 is repeated with the following modification: As soon as the reaction mixture melts at 235° C., the temperature is raised to 280° C. and maintained at that temperature for 30 minutes.

The polymer of Examples 1, 2 and 3 are shown by infra-red analysis to contain 1,3-benzene disubstitution and a secondary amine (function).

Analysis of samples of Examples 1, 2 and 3 are shown in Table 1:

TABLE 1

|       | Reaction time (min.) | Reaction temperature (° C.) | PMT (° C.) | Intrinsic viscosity ($\eta$) |
|-------|---------------------|-----------------------------|------------|------------------------------|
| Ex. 1 | 25                  | 230                         | 65–100     | 0.15                         |
| Ex. 2 | [1] 20              | [2] 250                     | 130–160    | 0.25                         |
| Ex. 3 | [1] 30              | [2] 280                     | 250–280    |                              |

[1] Reaction time after initial melting of the polymer at 230° C.
[2] Reaction temperature after initial melting of the polymer at 230° C.

Example 4

10.8 grams p-phenylenediamine and 18.1 grams p-phenylenediamine dihydrochloride are placed in a 30 ml. glass test tube and the temperature is brought to 260° C., over a 15-minute period. When the reaction mixture is molten a slow stream of nitrogen (about 20 to 30 cc./min.) is bubbled through the melt by means of a capillary tube extending through the test tube into the melt until the polymerization is terminated. The melt solidifies after 10 minutes at the elevated temperature.

The resulting polymer is transferred to a 3 l. flask and 193 ml. 72% by weight aqueous $H_2SO_4$ is added in which the polymer is soluble. The polymer solution is diluted by addition of 1,935 ml. of water then precipitated out of solution by the addition of 320 gm. of 25% by weight KOH in $H_2O$. After the precipitation has terminated, the sample is collected and subjected to definitive tests, the results of which are reported in Table 2 below.

Example 5

Example 4 is repeated with the following modification: As soon as the reactants are placed in the test tube the temperature is raised to 250° C., over a 10 minute period. When the reaction mixture is molten a slow stream of nitrogen (about 20 to 30 cc./min.) is bubbled through the melt by means of a capillary tube extending through the test tube into the melt. The melt becomes highly viscous and solidifies after 10 minutes at the elevated temperature. The temperature was raised to 285° C. for 15 minutes but the product did not remelt.

The samples of Examples 4 and 5 are insoluble in methanol.

Analysis of samples of the poly p-phenyleneimine of these examples is shown in Table 2.

TABLE 2

| | Reaction time (min.) | Reaction temperature (° C.) | PMT (° C.) | Intrinsic viscosity |
|---|---|---|---|---|
| Ex. 4 | 15 | 260 | 380 | 0.31 |
| Ex. 5 | 10 | 250 | 400 | |

The poly m-phenyleneimine of this invention is extremely useful as an epoxy ring-opening catalyst. The fact that poly m-phenyleneimine is inert at a temperature below its melting temperature combined with the fact that mixtures of epoxy resins and poly m-phenyleneimine are stable and react only upon the application of heat make poly m-phenyleneimine extremely useful in tire-cord adhesive systems based on epoxy resins.

Poly m-phenyleneimine is less toxic than its monomer. As a secondary aromatic amine it is less basic than most epoxy curing amines; and, thus, in an epoxy adhesive system used for polyester formed products in which the epoxy is normaly cured with amines, less polyester degradation will occur by using poly m-phenyleneimine as the curing agent. As an antioxidant, poly m-phenyleneimine is used in rubber stocks. It has the advantage over its monomer in not migrating through the rubber to form a bloom on the surface of the rubber. Heat curing of resorcinol- or phenol-aldehyde novolac resins is accelerated by the addition of poly m-phenyleneimine and yields highly cross-linked resins which are used as adhesives or thermosetting resins.

Poly p-phenyleneimine finds useful application as an antioxidant for use in systems such as rubber stocks which demand a highly polymeric antioxidant.

It should be noted that the molar ratio of the two reactants in the process of this invention is highly significant in determining the molecular weight of the resulting poly phenylenemine. If the ratio is about 1:1.25, the tetramer will be formed, a ratio of about 1:1.33 results in a trimer whereas a ratio of about 1:1.5 forms the dimer.

When a temperature of 250° C. to 280° C. is desired to be used to form the poly phenyleneimines of this invention, it is preferred to first form a reaction melt so as to safeguard against loss of the phenyleneimine monomer through volatilization.

Although the hereinbefore examples did not utilize monomers in which the aromatic nucleus contained lower alkyl groups, it should be obvious that such poly phenyleneimines are within the scope of the present invention.

It will be apparent that many widely different embodiments of this invention may be made without departing from the spirt and scope therefor, and therefore it is not intended to be limited except as indicated in the appended claims.

What is claimed is:

1. A linear polyimine consisting of the recurring unit

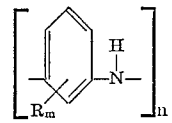

wherein $n$ is an integer of at least 5, R is a member selected from the group consisting of hydrogen and alkyls having from 1 to 4 carbon atoms and $m$ is an integer of from 1 to 4, with the proviso that adjacent recurring units have their amine group attached in the same relative position which is oriented in the meta position with respect to the aromatic nucleus.

2. Poly m-phenylenemine having at least 5 recurring m-phenyleneimine units.

3. A process for forming poly m-phenylenemines which comprises contacting and reacting substantially equimolar amounts of m-phenylenediamine and m-phenylenediamine dihydrochloride at atmospheric pressure and a temperature in the range of from about 220° C. to about 280° C. and continuing said reaction for a period of from about 10 to about 30 minutes.

References Cited

UNITED STATES PATENTS 2,723,244  11/1955  Joyce et al. _____ 260—2
2,924,620  2/1960  Miller _____ 260—576

FOREIGN PATENTS 989,559  4/1965  Great Britain.

OTHER REFERENCES

Green et al., "Jour. Chem. Soc.," London, vol. 97 (1910), p. 2400.

Kochar et al., "Jour. Indian Chem. Soc.," vol. 30, No. 12 (1953), pp. 829–835.

Willstäter et al., "Berichte der Deutschen Chemischen Gesellschaft," vol. 42 (1909), pp. 4118, 4119, 4125, 4126.

SAMUEL H. BLECH, *Primary Examiner.*

U.S. Cl. X.R.

260—576, 830, 002, 838, 045.9, 887